United States Patent
Brawner

(10) Patent No.: US 6,523,182 B1
(45) Date of Patent: Feb. 25, 2003

(54) BANDANNA FOR PETS

(76) Inventor: Sara Brawner, 1315 Diamond Head Dr., Encinitas, CA (US) 92024

( * ) Notice: Subject to any disclaimer, the term of this patent is extended or adjusted under 35 U.S.C. 154(b) by 0 days.

(21) Appl. No.: 10/064,347

(22) Filed: Jul. 3, 2002

(51) Int. Cl.[7] .................................................. A42B 5/00
(52) U.S. Cl. ........................................................ 2/207
(58) Field of Search ............................ 2/144, 206, 207, 2/279, 468, 916, 174, 98, 129, 912; 54/19.1; 119/714, 715, 792, 856, 857

(56) References Cited

U.S. PATENT DOCUMENTS

| | | | | |
|---|---|---|---|---|
| 3,914,797 A | * | 10/1975 | Stembridge | 2/207 |
| 5,465,689 A | * | 11/1995 | Winder | 119/654 |
| 6,209,140 B1 | * | 4/2001 | Ebeling | 119/792 |
| 6,282,722 B1 | * | 9/2001 | Pogachar | 2/206 |
| 6,325,024 B1 | * | 12/2001 | Masukawa | 119/856 |

* cited by examiner

*Primary Examiner*—John J. Calvert
*Assistant Examiner*—Katherine Moran
(74) *Attorney, Agent, or Firm*—Sturm & Fix LLP

(57) ABSTRACT

A scarf or bandanna for pets including a flexible scarf body having a forwarding edge and at least two trailing edges. In one embodiment, the forward edge has a continuous fixed radius of curvature throughout its length to fit the contour of the neck of a pet and the forward edge has ends thereon for selectively connecting the ends together to hold the scarf around the neck of a pet. This can be used in combination with or independently with respect to one or more flaps attached to the forward edge of the scarf. The flap shown has two flap parts, one of the flap parts having a hook portion thereon and the other flap part having a loop portion thereon whereby the hook portion and loop portion can be pressed together to attach the leading edge of the scarf to a collar of a pet.

4 Claims, 4 Drawing Sheets

BANDANNA FOR PETS

BACKGROUND OF INVENTION

1. Field of the Invention

This invention relates to a scarf or bandanna and more particularly to a scarf or bandanna for a pet such as a dog or a cat.

2. Description of the Related Art

U.S. Pat. No. 6,016,573 to Olson shows a scarf for pets. Similarly, U.S. Pat. No. D423,150 to Vignere shows a scarf for a dog. The aforementioned prior art scarf products are merely tied around the neck of a pet and it is only the tightness of the knot or connector between the two end corners of the scarf which will keep it in place. If the scarf is tied tightly so that it will not shift around the neck of the pet, then it will be uncomfortable for the pet and therefore be unsatisfactory.

U.S. Pat. No. 5,467,743 to Doose has a Velcro portion on a pet collar and has a scarf with a complementary hook and fastener on the front edge thereof. While this is a satisfactory solution to the aforementioned problem of keeping the scarf in place with respect to the collar itself, it is an expensive solution requiring that the collar be made especially for the scarf and the scarf especially for the collar. If the collar of this device shifts around the neck of the pet, then, of course, the scarf will shift as well.

Accordingly, there is a need for a scarf or bandanna for a pet which can be made inexpensively and which will stay in place comfortably without bunching of the collar of the scarf itself.

SUMMARY OF INVENTION

The present invention relates to a scarf or bandanna for pets including a flexible scarf body having a forwarding edge and at least two trailing edges. In one embodiment, the forward edge has a continuous fixed radius of curvature throughout its length to fit the contour of the neck of a pet and the forward edge has ends thereon for selectively connecting the ends together to hold the scarf around the neck of a pet. This can be used in combination with or independently with respect to a flap attached to the forward edge of the scarf. The flap has two flap parts, one of the flap parts has a hook portion thereon and the other flap part has a loop portion thereon whereby the hook portion and loop portion can be pressed together to attach the leading edge of the scarf to a collar of a pet.

An object of the present invention is to provide an improved scarf or bandanna for a pet.

Another object of the present invention is to provide a scarf for a pet which will not bunch up around the neck of the pet.

A still further object of the present invention is to provide a scarf for a pet which will stay in place because of attachment to a collar of the pet as well as be connected around the neck of such pet.

Other objects, advantages, and novel features of the present invention will become apparent from the following detailed description of the invention when considered in conjunction with the accompanying drawings.

DETAILED DESCRIPTION

Figure 1:
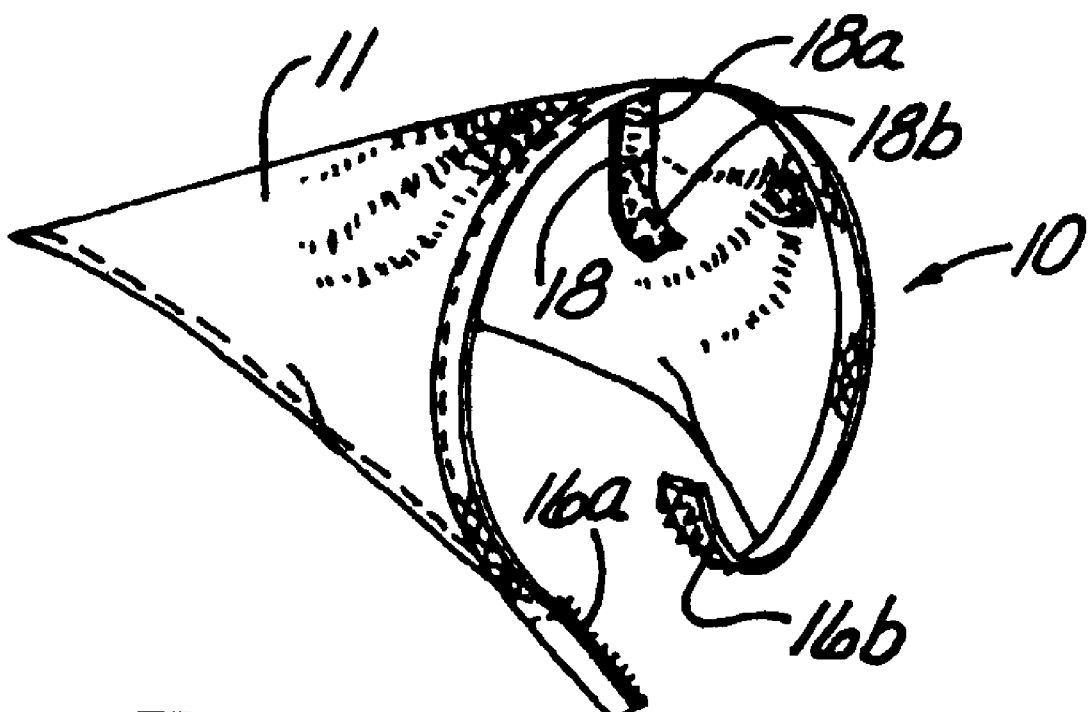
FIG. 1 is a perspective view of a preferred embodiment of the present invention.
Figure 3:
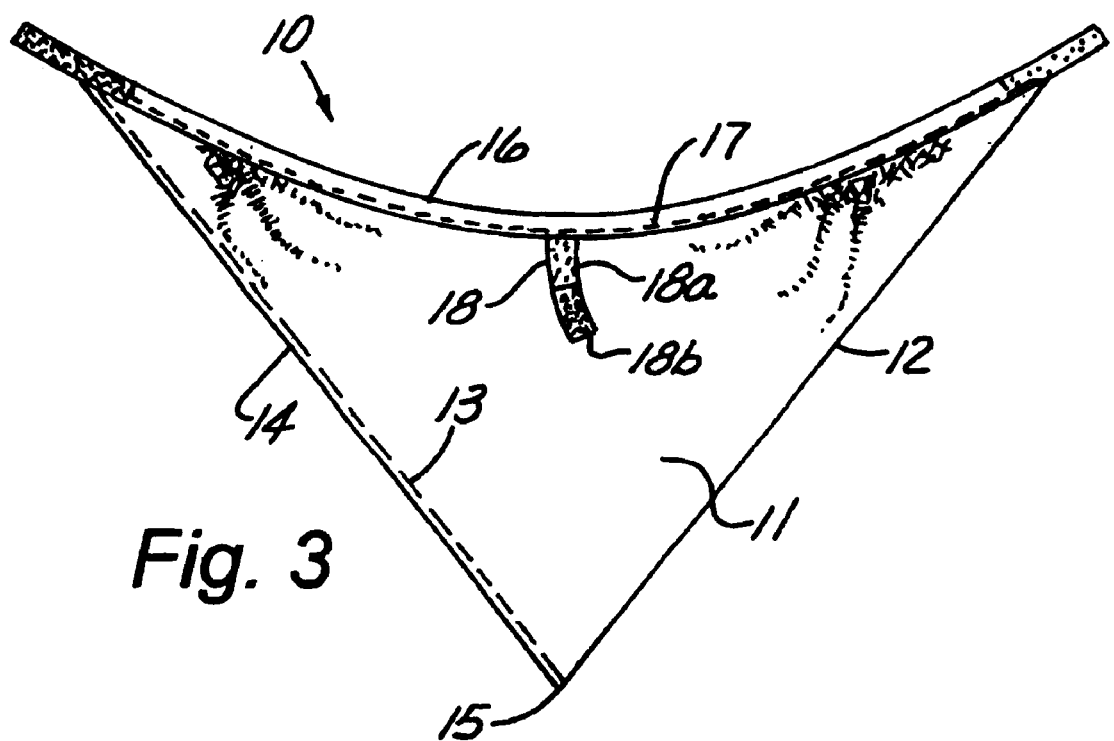
FIG. 3 is a bottom view of the scarf or bandanna of the present invention.

Referring now to the drawings wherein like reference numerals designate identical or corresponding parts throughout the several views, FIG. 1 shows a bandanna or scarf (10) constructed in accordance with the present invention. The scarf (10) has a body portion (11) which is preferably formed by folding a cloth along a line coincident with a trailing edge (12) and sewn with stitches (13) along another trailing edge (14). It is to be understood that the body (11) can be formed of just one sheet of material and the trailing edges (14) can be of any shape. Also, the shape of the scarf does not need to be substantially triangular-shaped as shown in FIG. 3, but may be in the shape of a square, rectangle, semi-circle or many other shapes. In a rounded shape, the trailing edges (12) and (14) could be continuous rather than be divided at the point (15) as shown in the preferred embodiment.

Figure 2:
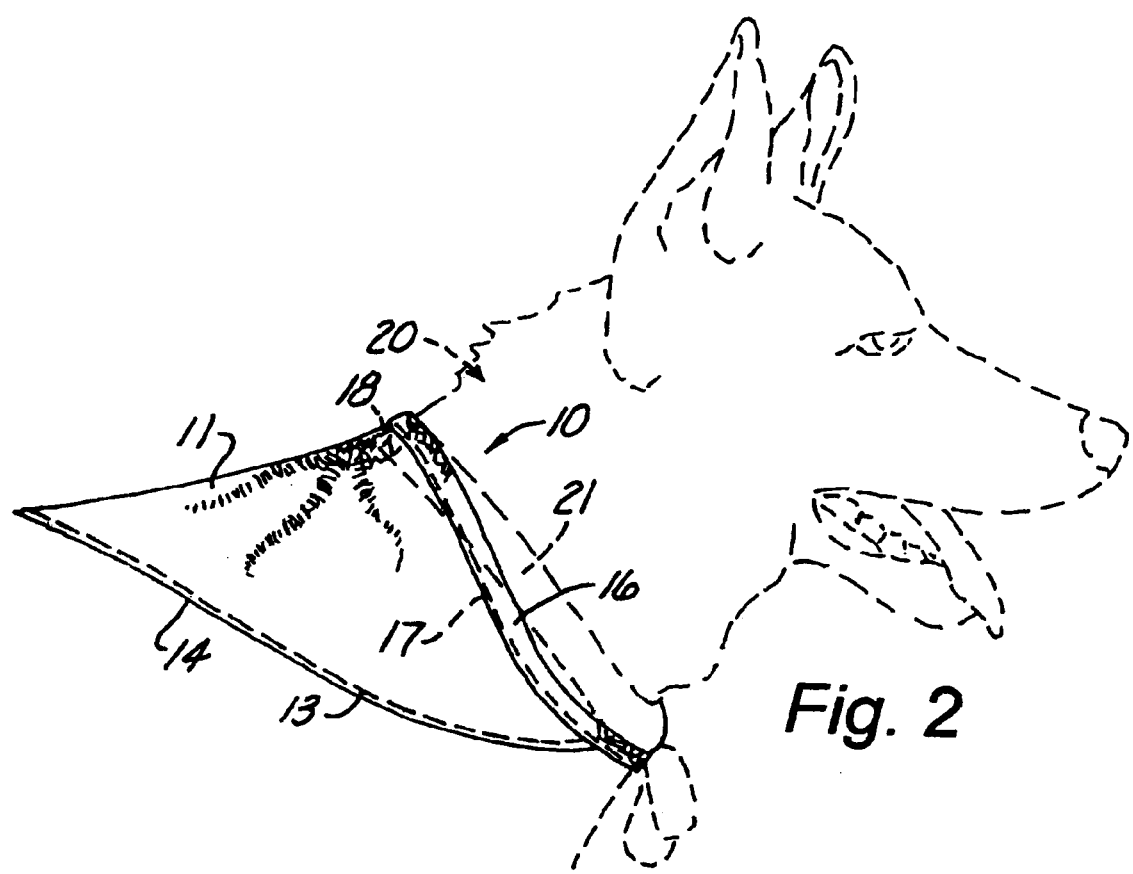
FIG. 2 is a side view of the present invention shown attached to a dog in dashed lines having a collar thereon.

The leading edge (16) of the scarf (10) is formed by a piece of cloth which is folded over each of the inside and outside surfaces and stitching (17) extends through this piece (16), through both layers of the body (11) and through flap (18) whereby the flap (18) is secured to the leading edge portion (16) of the scarf (10). The flap (18) has a hook portion (18a) and loop portion (18b) forming a hook and loop fastener as will be explained below. The ends of the forward edge portion (16) also have hook and loop fasteners thereon. Hook portion (16a) connects with loop portion (16b) when pressed together to attach around the neck of the dog (20) shown in FIG. 2. The ends having hook portion (16a) and loop portion (16b) could be merely flaps that are tied, or other fasteners could be used. The collar (21) on the dog (20) can be of any type and does not need to be made a special way in order for it to work with scarf (10), in contrast to the aforementioned collar of U.S. Pat. No. 5,467,743.

Figure 4:
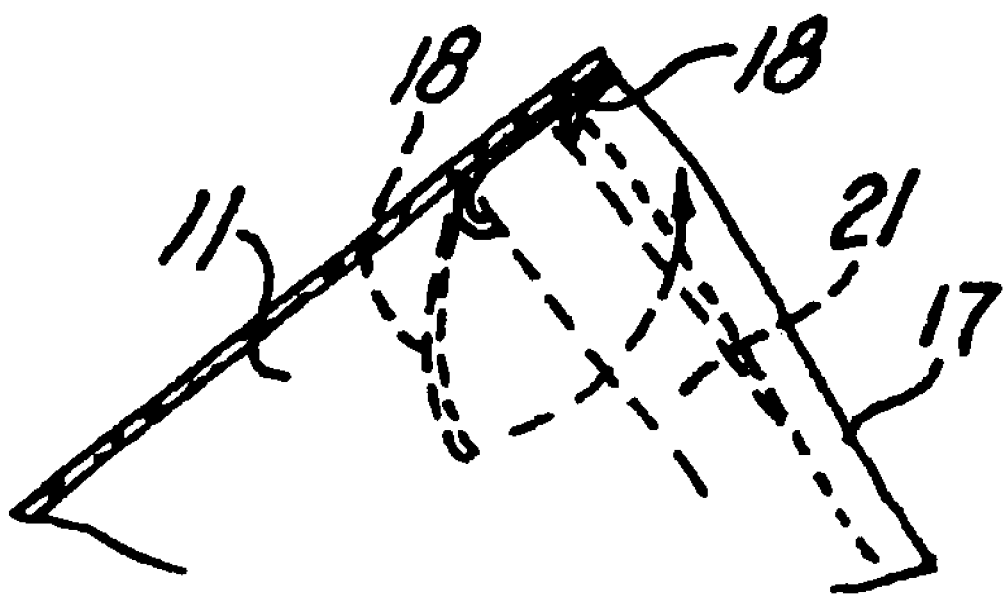
FIG. 4 is a cross sectional view of the bandanna taken from FIG. 2 and showing how a flap portion extends around the collar of the pet and attaches the forward edge of the scarf to the collar.

In use, the scarf is placed around the neck of the dog (20) with the flap (18a) on the underside, for example, as shown in FIG. 1. Then the ends of the leading edge are attached together. After that, the flap (18) is placed around the collar (21) as shown in FIG. 4 and hoop portion (18b) is pushed against hook portion (18a) to secure the leading edge (16) of the scarf (10) to the collar (21) of the dog (20). When the scarf is so attached to the dog (20), it will remain in place as initially attached under most conditions. Should the user decide to keep the scarf as shown on top in FIG. 2, then it will stay there or if the user decides to put the scarf on the underside as shown by some embodiments of U.S. Pat. No. D423,150, then it will stay in that position as well.

The flap (18) could, instead of being one flap with two portions of hook and loop fasteners (e.g. Velcro® brand) (18a) or (18b) could merely be two separate flaps (not shown) which could be tied around the collar (21), or could fasten in some other way such as hook portion being on one flap and a loop portion being on the other flap. Other types of common fasteners can be used as well, for example snaps or buttons.

The curved leading edge is referred to as a "comfort curve" neckband because it allows the scarf to lie flat against the dog's neck and back. It prevents bunching up behind the neck.

Accordingly it will be appreciated that the present invention does indeed accomplish the aforementioned objects. Obviously many modifications and variations of the present invention are possible in light of the above teachings. It is therefore to be understood that, within the scope of the appended claims, the invention may be practiced otherwise than as specifically described.

What is claimed is:

1. A scarf for pets comprising:

a flexible scarf body having a forward edge and at least two trailing edges, an inside surface and an outside surface, said forward edge having a continuous fixed radius of curvature throughout its length to fit the contour of the neck of a pet, said forward edge having ends thereon for selectively connecting said ends together to hold the scarf around the neck of a pet, wherein a mid-portion of said forward edge has a fastener thereon for extending around a collar which is around the neck of a pet and wherein said fastener comprises at least one flap and two flap parts, one of said flap parts having a hook portion thereon and the other of said flap parts having a loop portion thereon, whereby when said hook portion and said loop portion are pressed together they form a hook and loop type fastener to secure said forward edge to said collar.

2. The scarf of claim 1 wherein said scarf body comprises one piece of cloth folded over itself and sewn together at the edges thereof.

3. A scarf for pets comprising:

a flexible scarf body having a forward edge and at least two trailing edges, an inside surface and an outside surface, a mid-portion of said forward edge having a fastener attached on or adjacent thereto for extending around a collar which is around the neck of a pet, said forward edge having ends thereon for selectively connecting said ends together to hold the scarf around the neck of a pet, wherein said forward edge has a continuous fixed radius or curvature throughout its length to fit the contour of the neck of a pet and wherein said fastener comprises at least one flap and two flap parts, one of said flap parts having a hook portion thereon and the other of said flap parts having a loop portion thereon, whereby when said hook portion and said loop portion are pressed together they form a hook and loop type fastener to secure said forward edge to said collar.

4. The scarf of claim 3 wherein said scarf body comprises one piece of cloth folded over itself and sewn together at the edges thereof.

\* \* \* \* \*